(12) United States Patent
Li et al.

(10) Patent No.: US 11,618,173 B2
(45) Date of Patent: Apr. 4, 2023

(54) ROBOT JOINT AND ROBOT HAVING IHE SAME

(71) Applicant: UBTECH ROBOTICS CORP LTD, Shenzhen (CN)

(72) Inventors: Jian Li, Shenzhen (CN); Hongyu Ding, Shenzhen (CN); Youpeng Li, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 368 days.

(21) Appl. No.: 16/854,856

(22) Filed: Apr. 21, 2020

(65) Prior Publication Data
US 2021/0197404 A1    Jul. 1, 2021

(30) Foreign Application Priority Data
Dec. 31, 2019   (CN) .......................... 201911419446.7

(51) Int. Cl.
| B25J 17/00 | (2006.01) |
|---|---|
| H02K 11/215 | (2016.01) |
| H02K 11/22 | (2016.01) |
| F16H 49/00 | (2006.01) |
| F16H 57/02 | (2012.01) |
| H02K 7/08 | (2006.01) |
| H02K 7/116 | (2006.01) |

(52) U.S. Cl.
CPC ............ *B25J 17/00* (2013.01); *F16H 49/001* (2013.01); *F16H 57/02* (2013.01); *H02K 7/088* (2013.01); *H02K 7/116* (2013.01); *H02K 11/215* (2016.01); *H02K 11/22* (2016.01); *F16H 2057/02034* (2013.01); *F16H 2057/02073* (2013.01)

(58) Field of Classification Search
CPC ....... B25J 17/00; H02K 11/215; H02K 11/22; H02K 7/088; H02K 7/116; F16H 49/001; F16H 57/02; F16H 2057/02034; F16H 2057/02073
See application file for complete search history.

(56) References Cited

U.S. PATENT DOCUMENTS

| 4,096,766 A | * | 6/1978 | Pardo ...................... F16C 19/54 |
|---|---|---|---|
| | | | 901/22 |
| 10,500,734 B1 | * | 12/2019 | Xiong ...................... B25J 9/108 |
| 11,264,865 B2 | * | 3/2022 | Miyazawa ............... B25J 9/126 |
| 2007/0039414 A1 | * | 2/2007 | Takemura ............. F16H 49/001 |
| | | | 74/640 |

(Continued)

FOREIGN PATENT DOCUMENTS

| CN | 108247673 A | 7/2018 | |
|---|---|---|---|
| CN | 110388440 A | 10/2019 | |
| WO | WO-2019198525 A1 * | 10/2019 | ............ B25J 13/088 |

*Primary Examiner* — Zakaria Elahmadi

(57) ABSTRACT

A robot joint includes a casing, a motor assembly including a stator and a rotor that are arranged within the casing, and a harmonic drive received, at least in part, in the rotor. The harmonic drive includes a circular spline, a wave generator fixed to the rotor, and a flex spline. The circular spline is arranged around and engaged with the flex spline. The wave generator is received in the flex spline and configured to drive the flex spline to rotate with respect to the circular spline. The robot joint further includes an output shaft fixed to the flex spline.

12 Claims, 6 Drawing Sheets

(56) References Cited

U.S. PATENT DOCUMENTS

| | | | |
|---|---|---|---|
| 2008/0047511 A1* | 2/2008 | Taye | F01L 1/352 |
| | | | 123/90.15 |
| 2013/0257230 A1* | 10/2013 | Park | H02K 11/24 |
| | | | 310/68 B |
| 2016/0305527 A1* | 10/2016 | Chuo | H02K 7/116 |
| 2019/0181719 A1* | 6/2019 | Xiong | H02K 7/003 |
| 2020/0070339 A1* | 3/2020 | Kataoka | B25J 18/002 |

* cited by examiner

ROBOT JOINT AND ROBOT HAVING THE SAME

CROSS REFERENCE TO RELATED APPLICATIONS

This application claims priority to Chinese Patent Application No. 201911419446.7, filed Dec. 31, 2019, which is hereby incorporated by reference herein as if set forth in its entirety.

BACKGROUND

1. Technical Field

The present disclosure generally relates to robots, and particularly to a robot joint and a robot including the robot joint.

2. Description of Related Art

Robot joints are movable components of a robot that cause relative motion between adjacent links. A robot joint typically includes a motor and a speed reducer connected to the motor. For some robots designed to have a compact form factor, compact robot joints are required. Therefore, it is useful and desirable to provide a compact robot joint.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
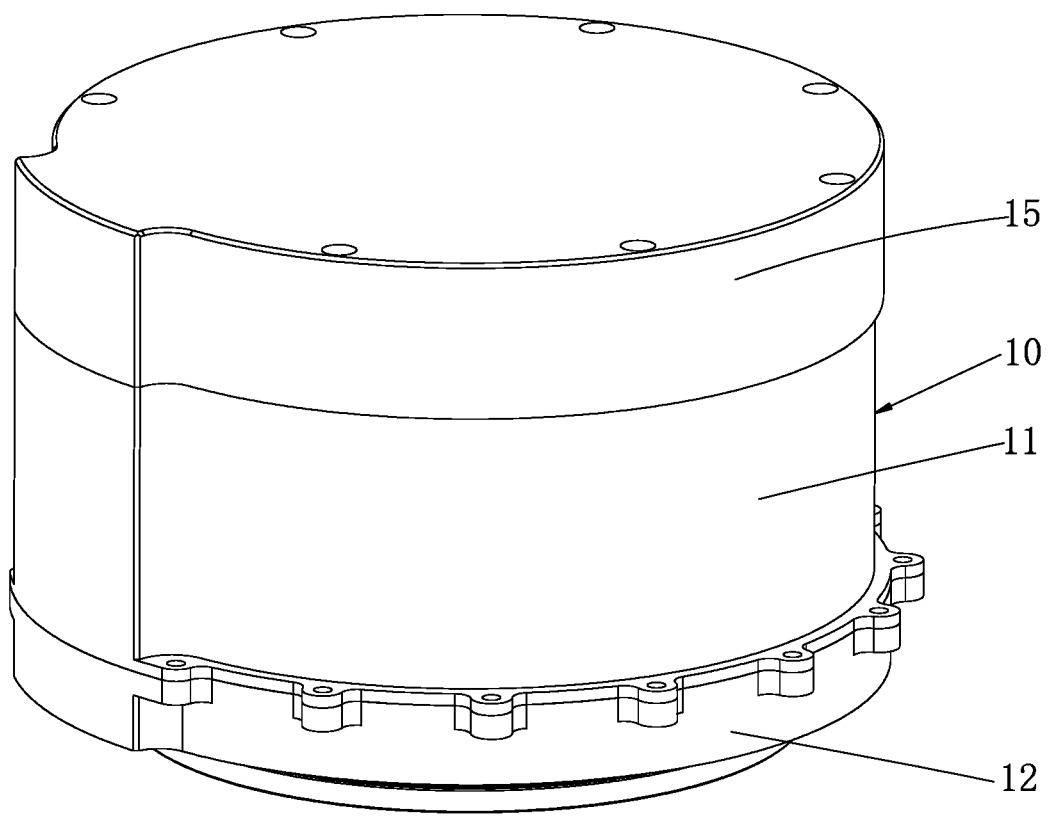
FIG. 1 is an isometric view of a robot joint according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
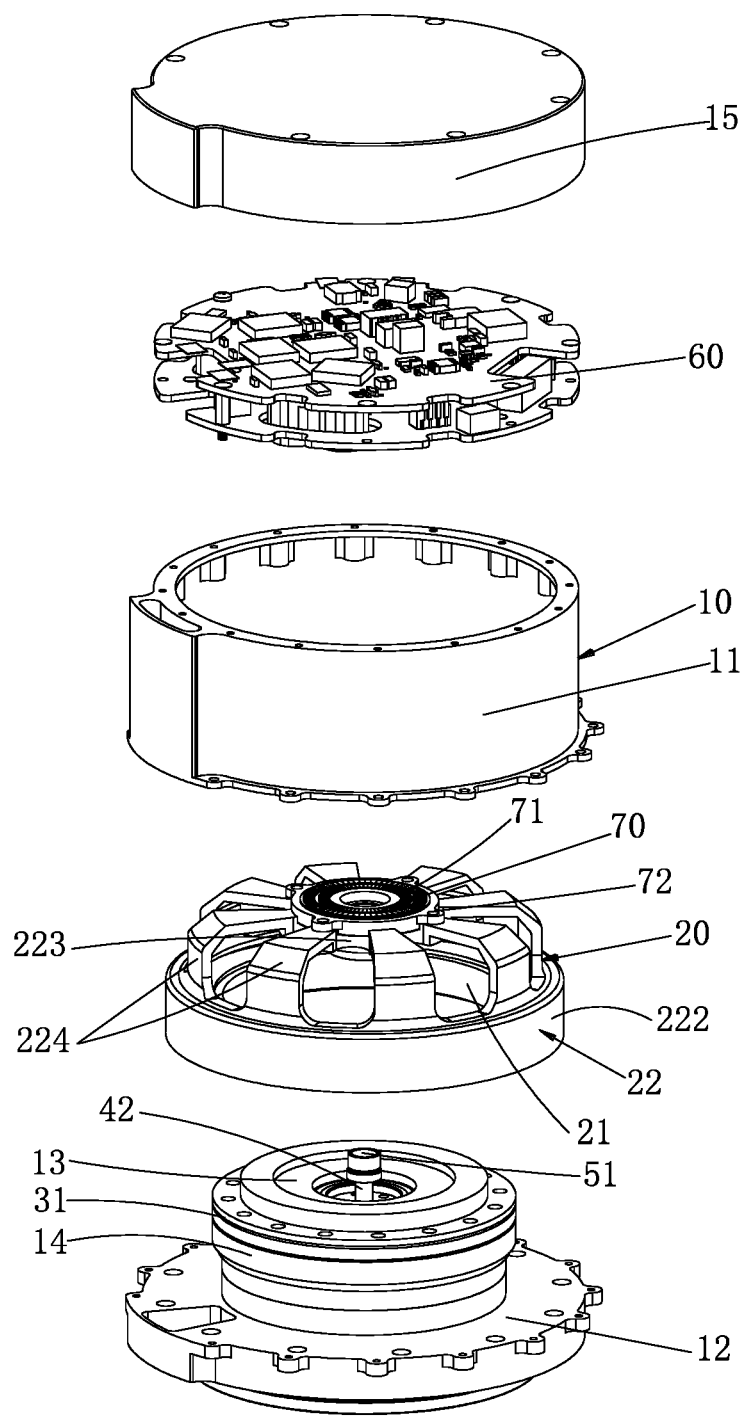
FIG. 2 is an isometric exploded view of the robot joint of FIG. 1.
Figure 6:
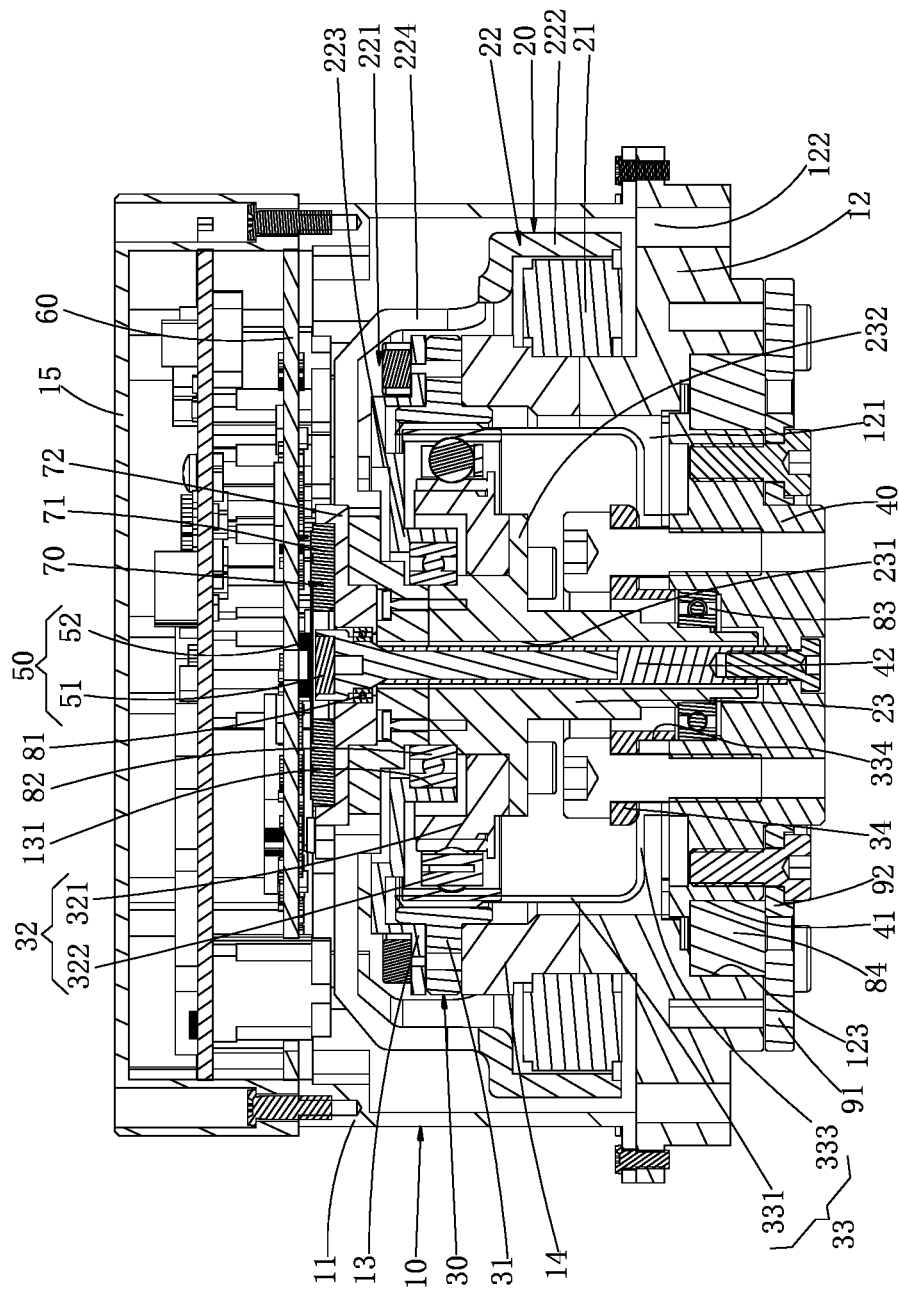
FIG. 6 is cross-sectional view of the robot joint of FIG. 1.

Referring to FIGS. 1, 2 and 6, in one embodiment, a robot joint for causing relative rotary motion between adjacent links of a robot includes a casing 10, a motor assembly 20, a harmonic drive 30, an output drive 40, an encoder 50 and a motor driver 60. The motor assembly 20 includes a stator 21 and a rotor 22 that are arranged within the casing 10. The rotor 22 is arranged around the stator 21. In one embodiment, the motor assembly 20 may further include a motor shaft 22 fixed to the rotor 22. When the stator 21 is energized, a rotating magnetic field is generated and drives the rotor 22 to rotate, which enables mechanical power to be transmitted through the motor shaft 23.

Figure 3:
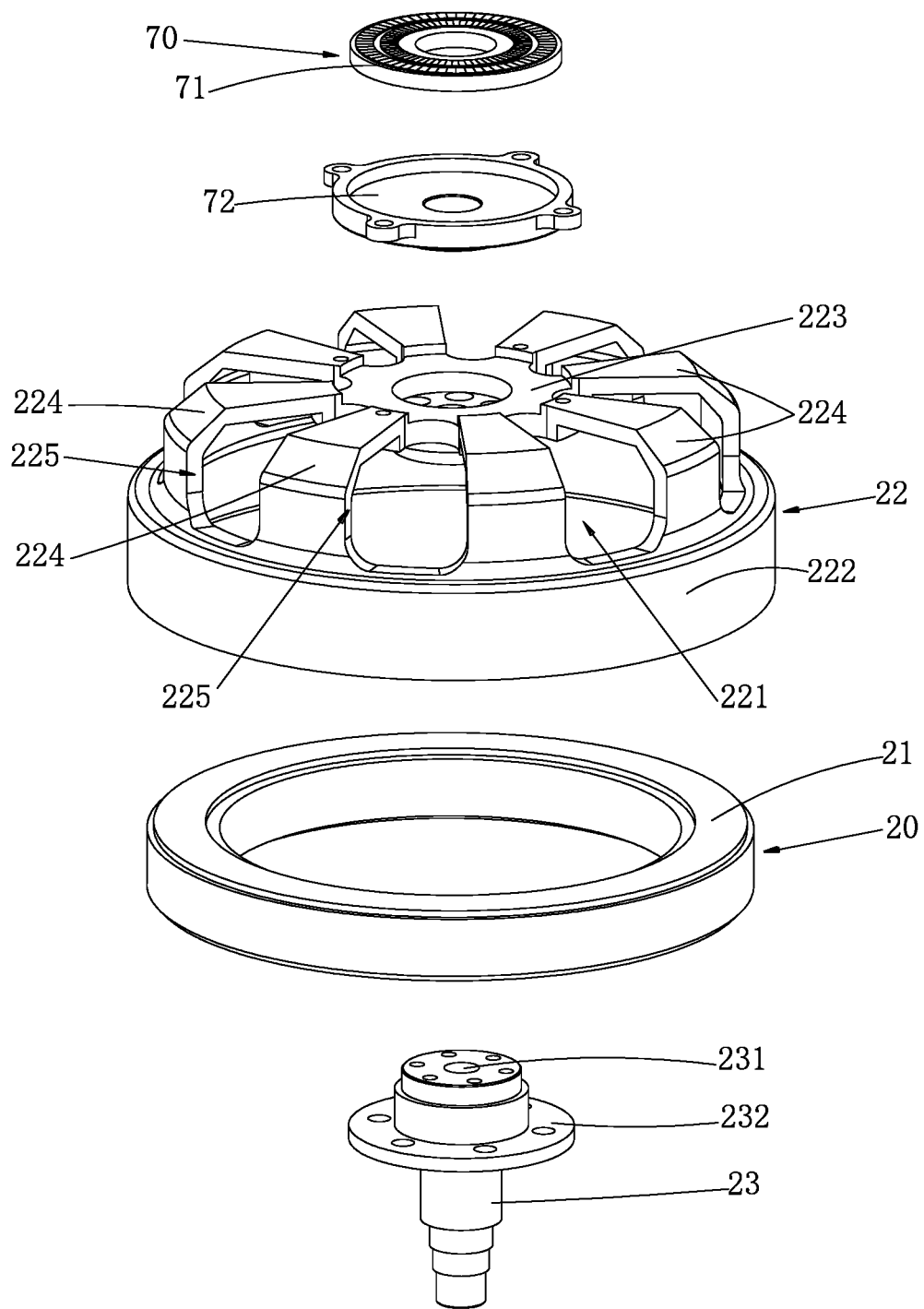
FIG. 3 is an isometric exploded view of a motor assembly of the robot joint of FIG. 1.
Figure 4:
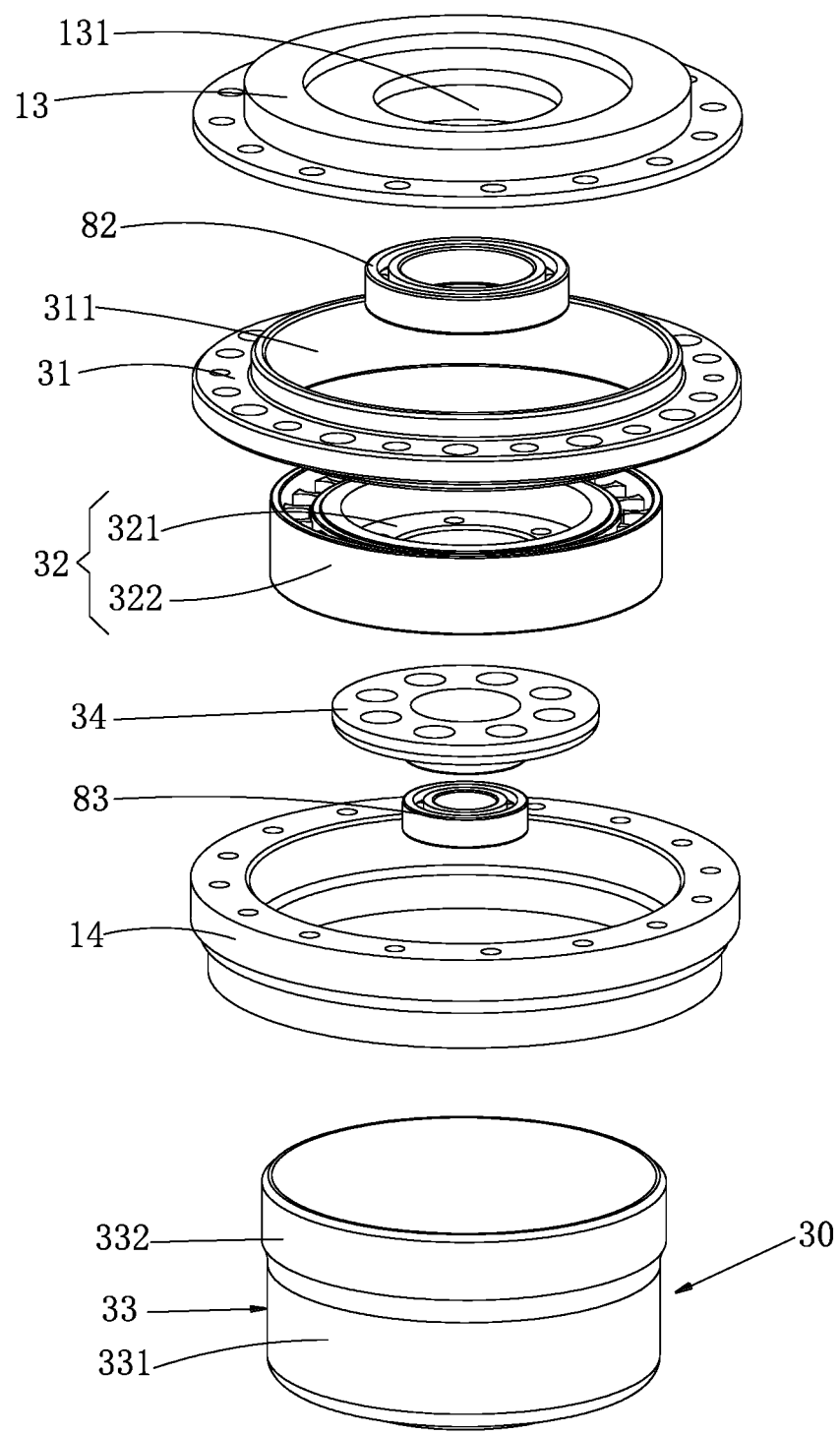
FIG. 4 is an isometric exploded view of a harmonic drive of the robot joint of FIG. 1.

Referring to FIGS. 3 and 4, in the embodiment, the harmonic drive 30 is at least partly received in the rotor 22, and includes a circular spline 31, a wave generator 32 fixed to the rotor 22, and a flex spline 33. The circular spline 31 is arranged around and engaged with the flex spline 33. The wave generator 32 is received in the flex spline 33 and configured to drive the flex spline 33 to rotate with respect to the circular spline 31. The wave generator 32 includes a cam 321 having an irregular periphery and a roller bearing 322 arranged around the cam 321. The flex spline 33 is arranged around the wave generator 32. The circular spline 31 has internal gear teeth 311, and the flex spline 33 has external gear teeth 332 that are engaged with the internal gear teeth 311. During operation, the rotor 22 drives the wave generator 32 which in turn causes flexible deformation of the flex spline 33. The circular spline 31 being fixed, the flex spline 33 then rotates with respect to the circular spline 31. The output shaft 40 is coaxially fixed to the flex spline 33 and can rotate synchronously with the flex spline 31.

The encoder 50 is configured to detect the rotation angle of the output shaft 40. The motor driver 60 is electrically connected to the encoder 50. The motor driver 60 is disposed in the casing 10, and configured to drive the motor assembly 20.

With such configuration that the harmonic drive 30 is almost completely received in the casing 10, the robot joint has a reduced axial dimension.

Figure 5:
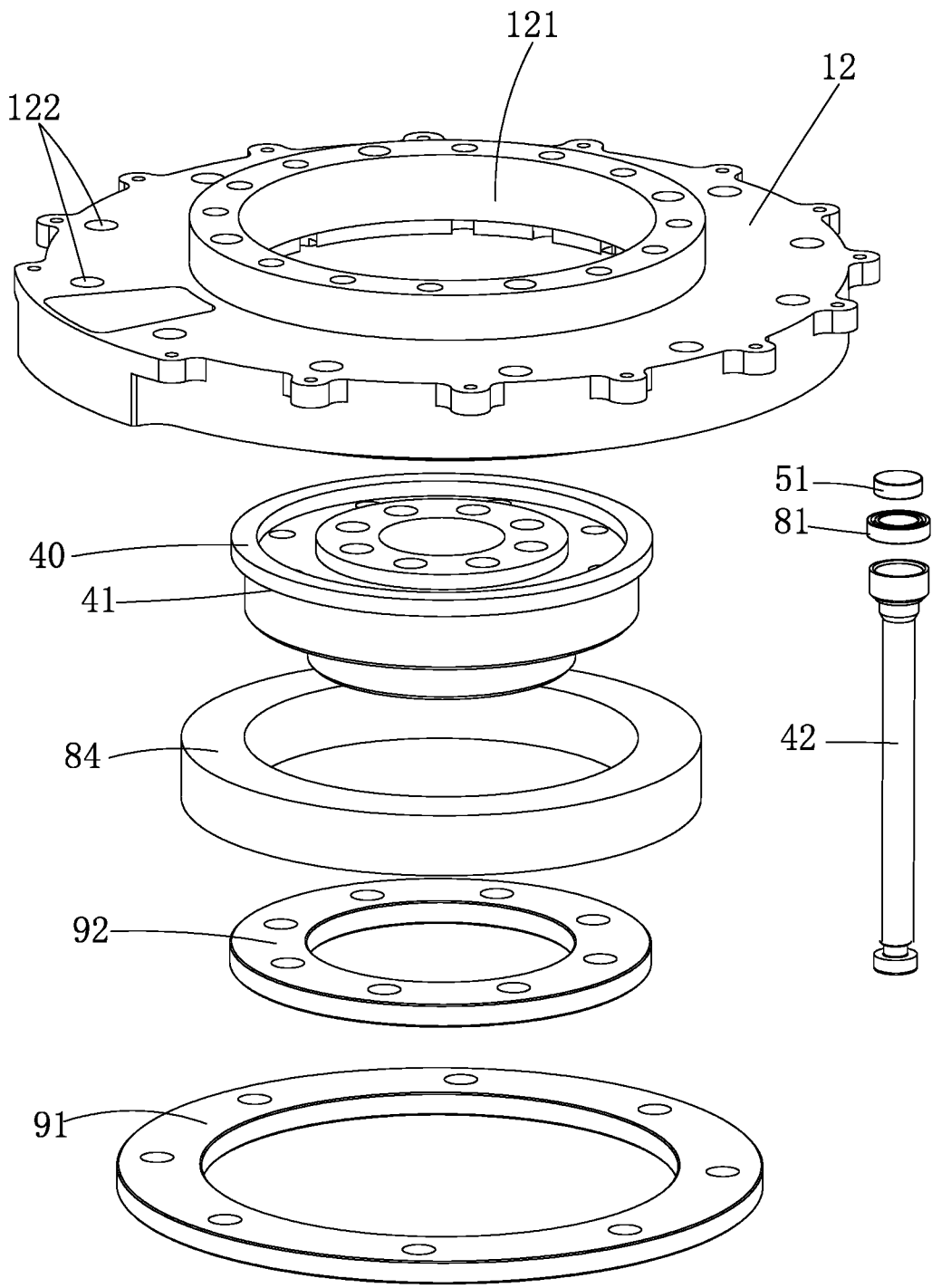
FIG. 5 is an isometric exploded view of an assembly including a base, an output shaft, a connection shaft and a fourth bearing of the robot joint of FIG. 1.

Referring to FIGS. 3, 5 and 6, in one embodiment, the wave generator 32 is fixed to the motor shaft 23. The flex spline 33 defines a first through hole 334 that allows the motor shaft 23 to pass therethrough. The motor shaft 23 defines a second through hole 231 along a lengthwise direction thereof. A connection shaft 42 is coaxially fixed to the output shaft 40 and passes through the second through hole 231. The encoder 50 includes a first member 51 fixed to one end of the connection shaft 42, and a first sensor 52 that is configured to detect a rotation angle of the output shaft 40 based on detection of a change of a first characteristics caused by rotation of the first member 51. With such an arrangement, one end of the motor shaft 23 can pass through the flex spline 33, and the encoder 50 and the output shaft 40 are respectively disposed at opposite axial ends of the motor assembly 20. The connection shaft 42 may be fixed on the output shaft 40 by screws. The first member 51 may be fixed to one end of the connecting shaft 42 by adhesives.

The encoder 50 may be used to detect the angular position of the output shaft 40. The output end encoder 50 may be a magnetic encoder or a photoelectric encoder.

When the encoder 50 is a magnetic encoder, the first member 51 is a magnet and the first characteristic is magnetic field. Specifically, when the output shaft 40 rotates, the first member 51 and the connecting shaft 42 rotate synchronously with the output shaft 40. The rotation of the first member 51 will cause the change of magnetic field. After detecting the change of the magnetic field, the first sensor 52 converts the rotational motion of the first member 51 into a pulse output to reflect the current rotation angle of the output shaft 40.

When the encoder 50 is a photoelectric encoder, the first member 51 is a slotted disc defining a number of rectangular slots that are evenly distributed along a circumferential direction. The first sensor 52 may include a light-emitting diode and a light-sensitive diode respectively arranged on opposite sides of the first member 51. When the output shaft 40 rotates, the first member 51 and the connecting shaft 42 rotate synchronously with the output shaft 40. The slotted disc intermittently interrupts the light beam from light-emitting diode as it rotates, which generates an optical pulse that can be received by the light-sensitive diode and used to determine the rotation angle of the output shaft 40.

Referring to FIGS. 3 and 6, in one embodiment, the robot joint further includes a motor encoder 70 that includes a second member 71 fixed to the rotor 22, and a second sensor that is configured to detect a rotation angle of the rotor 22 based on detection of a change of a second characteristics caused by rotation of the second member 71. In one embodiment, the second member 71 is annular and arranged around the first member 51. Similar to the encoder 50, the motor encoder 70 may be a magnetic encoder or a photoelectric encoder, which will not be described in detail.

In one embodiment, the first sensor 52 and the second sensor can be both disposed on and electrically connected to the motor driver 60, which allows for a compact structure.

Referring to FIGS. 3 and 6, in one embodiment, the robot joint further includes a mounting member 72 connected to the rotor 22. The second member 71 can be fixed on the mounting member 72 by adhesives. The mounting member 72 defines an orifice that allows the connection shaft 42 to pass therethrough. With such arrangement, the second member 71 is disposed on a predetermined position of the rotor 22. The connection shaft 42 is rotatably connected to the mounting member 72 through a first bearing 81 received in the orifice. The first bearing 81 provides a support to the connection shaft 42, which enables the connection shaft 42 to rotate about a desired rotation axis such that the rotation angle of the output shaft 40 can be accurately measured.

Referring to FIGS. 2 and 6, in one embodiment, the rotor 22 defines a chamber 221 and the harmonic drive 30 is at least partly received in the chamber 221. The motor shaft 23 is coaxially fixed to and at least partly received in the chamber 221. This arrangement makes full use of the inner space of the rotor 22, which allows the motor assembly 20 and the harmonic drive 30 to take up less space, thereby enabling the robot joint to have a reduced axial dimension. Compared with inner rotor motors, the stator 21 can be made to have a smaller axial dimension, so that the axial dimension of the motor assembly 20 will be reduced.

Referring to FIGS. 3 and 6, in one embodiment, the rotor 22 includes a hollow cylindrical portion 222 arranged around the stator 21, a bottom portion 223 and a number of connection members 224 connecting the bottom portion 223 to the cylindrical portion 222. One end of the motor shaft 23 is fixed to the bottom portion 223, for example, by screws. With such configuration, the chamber for receiving the harmonic drive 30 is formed. The connection members 224 are axially spaced apart from one another by slots 225, which allows heat generated inside the rotor 22 to be dissipated.

Referring to FIGS. 4 and 6, in one embodiment, the robot joint further includes a support member 13 fixed to the circular spline 31. The support member 13 defines a through hole 131 that allows the motor shaft 23 to pass therethrough. The motor shaft 23 is rotatably connected to the support member 13 through a second bearing 82 received in the through hole 131, and rotatably connected to the output shaft 40 through a third bearing 83. With such arrangement, the motor 23 can rotate about a desired rotation axis. The second bearing 82 and the third bearing 83 can be deep groove ball bearings that can bear axial and radial loads.

Referring to FIGS. 3 and 6, in one embodiment, an annular member 232 is disposed on the lateral surface of the motor shaft 23, and the wave generator 32 is fixed to the annular member 232. The wave generator 32 can be fixed to the annular member 232 by screws.

Referring to FIGS. 4 and 6, in one embodiment, the flex spline 33 includes a hollow cylindrical portion 331 and a bottom portion 333 connected to one end of the cylindrical portion 331. The cylindrical portion 331 is arranged around the wave generator 32 and engaged with the circular spline 31, and the bottom portion 333 is fixed to the output shaft 40. With such arrangement, the motor shaft 23 can be partly received in the cylindrical portion 331 and passes through the first through hole 334 in the bottom portion 333. The encoder 50 and the output shaft 40 can be arranged at opposite ends of the motor assembly 20, which allows for a compact structure. A fixing block 34 is located on the bottom portion 333. The flex spline 33 is fixed to the output shaft 40 by screws passing through the fixing block 34 and the bottom portion 333 and screwed into the output shaft 40.

Referring to FIGS. 2, 5 and 6, in one embodiment, the casing 10 includes a hollow cylindrical member 11 and a base 12 fixed to one end of the cylindrical member 11. The base 12 defines a through hole 121 that allows the output shaft 40 to pass therethrough, and the output shaft 40 is rotatably connected to the base 12 through a fourth bearing 84. With such arrangement, the output shaft 40 can smoothly rotate and bear a large load without deviating from a desired rotation axis during rotation. The fourth bearing 84 may use a cross roller bearing, which has high rigidity and adjustable bearing clearance, and allows for high-precision rotary motion.

Referring to FIG. 6, in on embodiment, the base 12 defines a number of ventilation holes 122 for heat dissipation of the motor assembly 20.

Referring to FIGS. 5 and 6, in one embodiment, the base 12 defines a chamber 123 for receiving the outer ring of the fourth bearing 84. The output shaft 40 defines a chamber 41 for receiving the inner ring of the fourth bearing 84. The chambers 123 and 41 form a receiving space to receive the fourth bearing 84. A first fixing plate 91 is fixed to the base 12, and a second fixing plate 92 is fixed to the output shaft 40. The first fixing plate 91 and the second fixing plate 92 abut against the fourth bearing 84 so as to hold the fourth bearing 84 in the receiving space. With such arrangement, the fourth bearing 84 can be easily fixed in the receiving space.

Referring to FIGS. 2, 4 and 6, in one embodiment, the robot joint further includes an annular support member 14 fixed to the base 12. The circular spline 31 is fixed to the support member 14. The circular spline 31 may be fixed to the support member 14 by screws. The flex spline 33 passes through the support member 14, which allows the robot joint to have a reduced axial dimension.

In one embodiment, the stator 21 is arranged around the support member 14 and a portion of the base 12. It should be noted that the stator 21 may be arranged around one of the support member 14 and a portion of the base 12. The stator 21 may be fixed to the support member 14 by adhesives, and the support member 14 and the base 12 can be fixed to each other by screws.

Referring to FIGS. 2 and 6, in one embodiment, the cylindrical member 11 may have two opposite open ends. The casing 10 further includes a top cover 15 fixed to the cylindrical member 11 opposite the base 12. The motor driver 60 is received in and protected by the top cover 15.

The present disclosure further provides a robot including the robot joint as described. With the configuration that the harmonic drive 30 is almost completely received in the casing 10, the robot joint has a reduced axial dimension.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robot joint comprising:
   a casing;
   a motor assembly comprising a stator and a rotor that are arranged within the casing, the rotor being arranged around and rotatable with respect to the stator;
   a harmonic drive received, at least in part, in the rotor, the harmonic drive comprising a circular spline, a wave generator fixed to the rotor, and a flex spline, the circular spline being arranged around and engaged with the flex spline, the wave generator being received in the flex spline and configured to drive the flex spline to rotate with respect to the circular spline;
   an output shaft fixed to the flex spline; and
   a motor shaft fixed to the rotor, an encoder and a connection shaft, wherein the wave generator is fixed to the motor shaft, the flex spline defines a first through hole that allows the motor shaft to pass therethrough, the motor shaft defines a second through hole along a lengthwise direction thereof, the connection shaft is coaxially fixed to the output shaft and passes through the second through hole, the encoder comprises a first member fixed to one end of the connection shaft, and a first sensor that is configured to detect a rotation angle of the output shaft based on detection of a change of a first characteristics caused by rotation of the first member.

2. The robot joint according to claim 1, further comprising a motor encoder that comprises a second member fixed to the rotor, and a second sensor that is configured to detect a rotation angle of the rotor based on detection of a change of a second characteristics caused by rotation of the second member.

3. The robot joint according to claim 2, further comprising a mounting member connected to the rotor, wherein the second member is disposed on the mounting member, the mounting member defines an orifice that allows the connection shaft to pass therethrough, and the connection shaft is rotatably connected to the mounting member through a first bearing received in the orifice.

4. The robot joint according to claim 1, wherein the motor shaft is coaxially fixed to and at least partly received in the rotor.

5. The robot joint according to claim 4, wherein the rotor comprises a hollow cylindrical portion arranged around the stator, a bottom portion and a plurality of connection members connecting the bottom portion to the cylindrical portion, the plurality of connection members are axially spaced apart from one another by slots.

6. The robot joint according to claim 1, further comprising a motor shaft fixed to the rotor and a support member fixed to the circular spline, wherein the support member defines a through hole that allows the motor shaft to pass therethrough, the motor shaft is rotatably connected to the support member through a second bearing received in the through hole, and rotatably connected to the output shaft through a third bearing.

7. The robot joint according to claim 1, where the flex spline comprises a hollow cylindrical portion and a bottom portion connected to one end of the cylindrical portion, the cylindrical portion is arranged around the wave generator, and the bottom portion is fixed to the output shaft.

8. The robot joint according to claim 1, wherein the casing comprises a hollow cylindrical member and a base fixed to one end of the cylindrical member, the base defines a through hole that allows the output shaft to pass therethrough, and the output shaft is rotatably connected to the base through a fourth bearing.

9. The robot joint according to claim 8, further comprising a first fixing plate and a second fixing plate, wherein the base and the output shaft define a receiving space to receive the fourth bearing, the first fixing plate is fixed to the base, the second fixing plate is fixed to the output shaft, and the first fixing plate and the second fixing plate abut against the fourth bearing so as to hold the fourth bearing in the receiving space.

10. The robot joint according to claim 8, further comprising an annular support member fixed to the base, wherein the circular spline is fixed to the support member, and the flex spline passes through the support member, and the stator is arranged around the support member.

11. The robot joint according to claim 8, further comprising a motor driver, wherein the casing further comprises a top cover fixed to the cylindrical member opposite the base, and the motor driver is received in the top cover.

12. A robot comprising:
    a robot joint, the robot joint comprising:
      a casing;
      a motor assembly comprising a stator and a rotor that are arranged within the casing, the rotor being arranged around and rotatable with respect to the stator;
      a harmonic drive received, at least in part, in the rotor, the harmonic drive comprising a circular spline, a wave generator fixed to the rotor, and a flex spline, the circular spline being arranged around and engaged with the flex spline, the wave generator being received in the flex spline and configured to drive the flex spline to rotate with respect to the circular spline;
      an output shaft fixed to the flex spline; and
      a motor shaft fixed to the rotor, an encoder and a connection shaft, wherein the wave generator is fixed to the motor shaft, the flex spline defines a first through hole that allows the motor shaft to pass therethrough, the motor shaft defines a second through hole along a lengthwise direction thereof the connection shaft is coaxially fixed to the output shaft and passes through the second through hole, the encoder comprises a first member fixed to one end of the connection shaft, and a first sensor that is configured to detect a rotation angle of the output shaft based on detection of a change of a first characteristics caused by rotation of the first member.

* * * * *